United States Patent [19]

Rivers et al.

[11] Patent Number: 5,754,748
[45] Date of Patent: May 19, 1998

[54] DOWNLOAD OF INTERPRETER TO A PRINTER

[75] Inventors: Martin Geoffrey Rivers, Lexington, Ky.; Christopher Mark Songer, Foster City, Calif.; Hugh Deral Spears, Lexington, Ky.

[73] Assignee: Lexmark International, Inc., Lexington, Ky.

[21] Appl. No.: 713,300

[22] Filed: Sep. 13, 1996

[51] Int. Cl.⁶ .................................................. G06K 15/00
[52] U.S. Cl. .......................................... 395/116; 395/112
[58] Field of Search ................................. 395/101, 112, 395/114, 115–116, 117, 892, 882, 884, 893, 894, 828; 707/514, 509, 515, 516; 345/515, 516, 517

[56] References Cited

U.S. PATENT DOCUMENTS

| | | | |
|---|---|---|---|
| 5,179,610 | 1/1993 | Ishikawa | 395/500 |
| 5,222,200 | 6/1993 | Calister et al. | 395/112 |
| 5,353,388 | 10/1994 | Motoyama | 395/117 |
| 5,446,837 | 8/1995 | Motoyama et al. | 707/514 |

*Primary Examiner*—Arthur G. Evans
*Attorney, Agent, or Firm*—John A. Brady

[57] ABSTRACT

Printer (1) has code in memory (5) to interpret one or more page description languages and also stores in memory (5) a table of routines useful in other interpreters and their addresses, as well as code to link partially compiled object code in response to directions in Relocation Tables in the partially compiled code. Data is downloaded to the printer by cable (23) to add another interpreter to the printer. That data is employed by the linking code, which responds to the directions in the Relocation Tables to complete the new interpreter making use of routines already stored in the printer. Since the stored routine table is lengthy, it is compressed. The routine table may be downloaded rather than permanently stored.

7 Claims, 2 Drawing Sheets ature of a printer and FIG. 2 is a flow diagram of the
DOWNLOAD OF INTERPRETER TO A PRINTER

TECHNICAL FIELD

This invention relates to computer controlled apparatus, specifically printers, which interpret received data in more than one protocol or "language."

BACKGROUND OF THE INVENTION

This invention involves the incorporation of code linking tables and routines in a printer to permit downloaded code to be linked into the code of the apparatus. The primary purpose is to permit a printer which has code to interpret one or more specific page description languages to receive additional code which permits the printer to process a different page description language using much of the interpreter code already in the printer.

No prior art employing tables is known. The QMS 1660 printer receives downloaded data which results in the printer interpreting new data, but how this is done is unknown. The downloading of routines is known. In the printing art it is known to download font renderers and custom operators. U.S. Pat. No. 5,222,200 to Callister et al discloses a printer which has embedded code to automatically use the interpreter code for the language being received. U.S. Pat. No. 5,179,690 to Ishikawa discloses computer controlled display apparatus which has embedded an emulation system which substitutes data during emulation. U.S. Pat. No. 5,353,388 to Motoyama discloses a document processing system which operates on documents stored in different languages.

Although printer code is compiled in standard manner in which a table of routines available and their location is in the code used by the compiler, this is not needed in the final code and is not part of it. Accordingly, printer code prior to this invention did not include a table of routines and their location.

DISCLOSURE OF THE INVENTION

In accordance with this invention, the printer code does have a table of routines and their locations. Since such a table is lengthy, it is preferably compressed. In addition the printer code includes a linking routine which may be essentially standard. Data downloaded to the printer to add an additional interpreter to the printer invokes the linking routine and provides instructions for linking. Preferably, the downloaded data is in object code form to a great extent and needs only be completed by adding the location of routines from the routine table in the printer, and by storing the finished code and the addresses at which it is stored. The routine table in the printer may be permanently installed in the printer or downloaded at the time when an additional interpreter is to be formed.

It should be understood that the term "routine" in the context of this invention includes the storing of variables which may be used by different functional routines. Variables may be any data subject to change, such as data defining when the operator has entered a paper size selection or data defining whether printing is to be on one side of the paper or on both sides (termed duplex).

BRIEF DESCRIPTION OF THE DRAWING

The details of this invention will be described in connection with the accompanying drawing, in which.

BEST MODE FOR CARRYING OUT THE INVENTION

Figure 1:
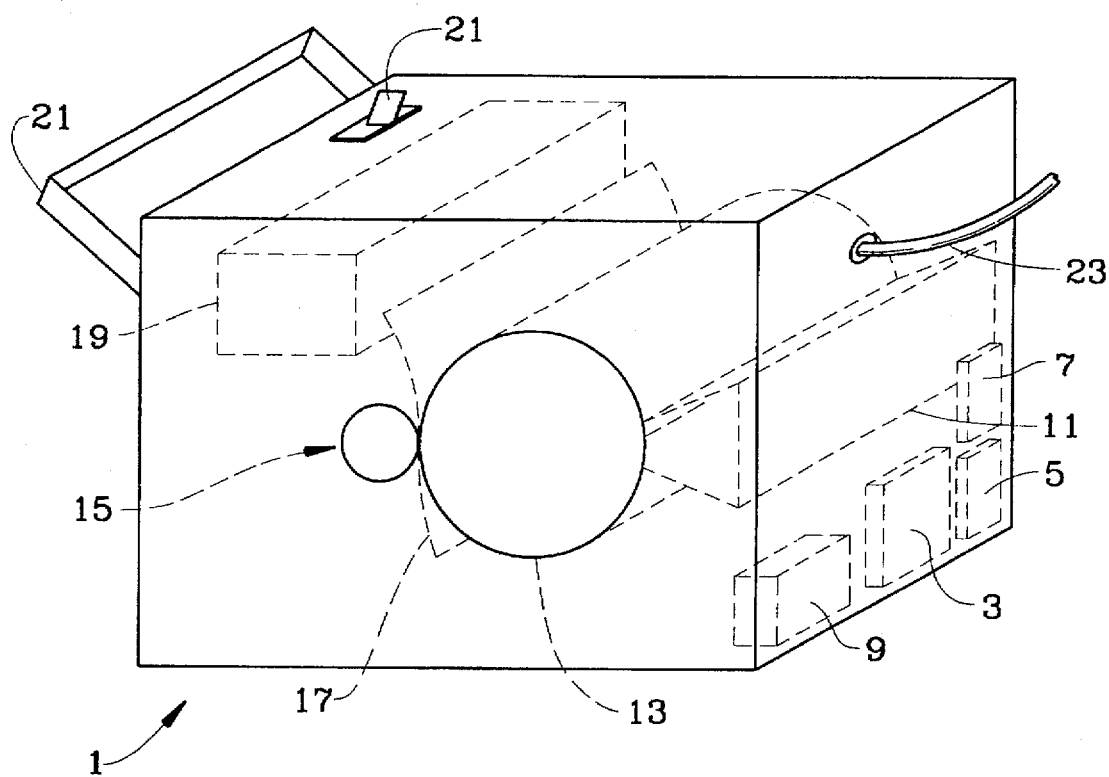
FIG. 1 is illustrative of a printer and FIG. 2 is a flow diagram of the linking done by the printer.

Printer 1, shown illustratively in FIG. 1, is a standard laser printer widely sold by the assignee of this invention which has the internal code to interpret PostScript (trademark) and PCL (trademark) page description languages, as well as PJL, a control code set, the reset code SIC (for set initial conditions), and to print from downloaded bit maps created by Windows (trademark) software. Printer 1 is controlled by microprocessor 3, which has standard Read Only Memory or ROM 5 and read/write memory, DRAM, 7. Downloaded code may be stored for use by Microprocessor 3 in non-volatile random access memory 9, which may be flash memory or disc storage, as is now known. The illustrated printer 1 has an optical system 11 operative on a photoconductive drum 13. Drum 13 is toned and transfers the toned imaged defined by optical system 5 at transfer station 15 to paper 17. The image is fixed, typically by heat, at fixing station 19, and the finished printed page is delivered to output tray 21. Printer 1 receives code to be interpreted and downloaded code on cable 23 and has an operator control panel shown as switch 25.

Printer 1 is configured with both a table of routines and their address in ROM 5. Additionally, code to link downloaded codes is stored in ROM 5. It should be understood that the term "routine" in the context of this invention includes the storing of variables which may be used by more than one functional routine. Variables define factors subject to change, such as paper tray selection, interrupt input from an operator control panel and any other such factor. The term "Symbol" is sometimes used to encompass both functional routines and variables. That terminology is unnecessary here since the term "routine" is understood to encompass associated variables.

The code to be downloaded to add an interpreter to printer 1 is first prepared. This downloadable code is created first by using a standard compiler and linker. The compiler performs the usual task of compiling all source code modules into object code files; then the linker combines the object files into a Common Object File Format (often abbreviated COFF) file. While the output files of most linkers are ready (or almost ready) to be executed, the COFF file for a downloaded interpreter in accordance with this invention is not nearly ready for execution. Many of the functions and data variables addressed by the interpreter are resident in the printer 1 and are not available to the linker at this time. These are termed "external" routines. The external routines are not available at this time, but they are included in a section of the COFF file termed "Relocation Tables", which contain directions for further operations of the related data, termed Raw Data. Additionally, the functions and data belonging to the interpreter itself (termed the "internal" routines) cannot be completely acted on because their final disposition depends on precisely where they are stored by microprocessor 3 when the interpreter is integrated with the printer 1. Thus, the COFF file is only partially linked, and considerably more data processing is required prior to executing the interpreter.

A custom tool, the COFF file Preprocessor, is next employed to process the partially linked COFF file. The Preprocessor will complete any work that does not depend on the printer system, and will rearrange the contents so that the processing and resources required of the printer 1 are minimized. The Preprocessor creates a separate file, simply known as the "preprocessed" file, as its output, since the rearranged file is no longer in Common Object File Format.

The following listing 5 shows the major components of a COFF file and their order in the COFF file: COFF File Headers, Section 1 Raw Data, Section 2 Raw Data . . . Section n Raw Data, Section 1 Relocation Tables, Section 2 Relocation Tables . . . Section n Relocation Tables, Routine Table.

The COFF File Headers basically identify how much data is in all the components and where it is all located. The Raw Data sections are sets of program code, various types of data, or, in some cases, merely information. The Relocation Tables tell which of the Raw Data elements need to be resolved and which routine in the Routine Table is to be used to resolve it. The Routine Table contains all routine names (program functions and variable names) that are referenced in the Raw Data sections and a statement of where the routine is located (including a note to indicate if it is an "external" routine symbol).

The Preprocessor initially discards any information sections, since they are for documentation only and do not contain any code or data necessary for execution. This is accomplished by not writing the information section of Raw Data to the output preprocessed file and destroying the note of its existence in the Headers.

The Preprocessor now extracts only the "external" routines from the Routine Table and writes this reduced table of external routines to the beginning of the output file. The external routines are those stored in memory of printer 1 and will be needed to do the final linking in the printer I at the time of download. The internal routines will be processed during this preprocessing phase. The reduced, external routine table is much smaller than the COFF Routine Table (typically less than 10%) and its placement at the beginning of the file will facilitate the processing required by the printer 1 at the time of download.

The Preprocessor now begins its relocation processing. A section of Raw Data is retrieved, along with the Relocation Tables of the same section, and processed in conjunction with the Routine Table of the COFF File (the unreduced one). Each Relocation Table element identifies a code or data element in the Raw Data Section, the number of the associated function or data variable name in the Routine Table, and the type of relocation to be accomplished. If a Relocation Table element refers to an external routine name, it cannot be resolved at this time, and is passed on to the output file to be processed by the printer 1. If the Relocation Table element refers to an internal routine, the Preprocessor will resolve the routine in relation to the associated Raw Data section. The resulting resolution is merged into the Raw Data element, and a note is added to the Relocation Table element to indicate that the base address of where the section is finally located by the printer 1 must be merged with the Raw Data element to complete the final relocation. Note the internal routine name is no longer needed, so it is discarded.

When an entire section has been relocated, its Raw Data is written to the output file, followed by its Relocation Table. When all sections are processed, the Raw Data and Relocation Tables are interspersed in the output file. This is in contrast to the original COFF File, which had all Raw Data sections together, followed by all Relocation Tables. Since the printer 1 needs three things to begin processing (Raw Data, Relocation Table, and Routine Table), this rearrangement will allow the printer 1 to begin its processing slightly earlier. The normal COFF File format would require the entire file to be downloaded and set aside in temporary resource before beginning processing. The rearranged preprocess output file is in the order shown in the following: Preprocessed File Headers, External Routine Table, Section 1 Raw Data, Section 1 Relocation Tables, Section 2 Raw Data, Section 2 Relocation Tables . . . Section n Raw Data, Section n Relocation Tables.

That completes the preparation of code to be downloaded to the printer 1. Printer 1 has stored in ROM 5 a Routine Table which contains every routine that such download code might call. Such routines including variables can number about 8,000 in some applications and about 15,000 or more in other applications, depending on the number and complexity of the interpreter or interpreters to be downloaded to the printer 1. These are the external routines. All of these external routines are necessarily existing routines, since it is a purpose of this invention to make maximum use of routines already in the printer 1. Representative functional routines (as distinguished from variables) found in the Routine Table are as follows:

Mathematical Functions

1. Divide signed number by another signed number.
2. Multiply numbers.
3. Divide unsigned numbers by unsigned numbers.
4. Compute square root of numbers, lowest precision.
5. Compute square root of numbers, double precision.
6. Compute exponent of a number, lowest precision.
7. Compute angle which with tangent of given number.

Character Manipulation Services

1. Strlen - Determine the length of a character string.
2. Strcmp - Compare one character string to another.
3. Strncmp - Compare a portion of one character string to another.
4. Strncpy - Copy a portion of one character string to another.
5. Strncat - Append a portion of one character string to another.
6. Strcat - Append one character string to another.
7. Memset - Set a block of memory to a given value.
8. Memcpy - Copy of block of memory.

Conversions

1. Cnvfp2si - Convert a floating point real number to a signed integer.
2. Cnvfp2dp - Convert a floating point real number to a double precision integer.
3. Cnvdp2ui - Convert a double precision integer to an unsigned integer.
4. Cnvdp2fp - Convent a double precision integer to a floating point real number.
5. Cnvui2dp - Convert an unsigned integer to a double precision integer.
6. Cnvui2fp - Convert an unsigned integer to a floating point real number.
7. Cnvsi2fp - Convert a signed integer to a floating point real number.
8. Cnvdp2si - Convert a double precision integer to a signed integer.
9. Cnvsi2dp - Convert a signed integer to a double precision integer.
10. Cnvfp2ui - Convert a floating point real number to an unsigned integer.

Printing Functions

1. Return the X, Y coordinates of an element.
2. Create a line segment between (0,0) and a point P.
3. Make a font available throughout the system.
4. Create a circular arc specified by three points.
5. Invert the intensities in an image.
6. Print the page.

Although the routines are stored in the standard printer, generally in the same block of memory, a table identifying the routines is not, as there is typically no need for a standard printer to have such a table after the code is compiled.

ROM 5 of printer 1 also contains code to execute the final linking of the downloaded code, which requires applying the routines of the Routine Table as directed by the Relocation Tables, as well as determination of available data storage space and storing of linked code to such space. Such functions are standard techniques and so will not be elaborated upon. Accordingly, the downloaded code either carries a header which activates the linking process of microprocessor 3 or this is activated from a control panel of printer 1.

In the embodiment just described, the resulting code in printer 1 is a new interpreter which employs as much as possible existing code in printer 1. It is accordingly, not excessively demanding of memory space. The Routine Table in printer 1 is not normally in printers and could require large amounts of memory. Therefore, the Routine Table is compressed, the preferred compression being as follows:

Compression of Routine Table

A utility program for compression creates the compressed Routine Table by extracting each system routine that may be needed by the downloaded code. Location of all such routines is found by examination of the original operating system code of printer 1. The name and address are encoded into a relatively small identification number, and the Routine Table is a file containing all of the encoded values. The compression method used reduces the amount of required storage for the names from about 14 bytes (a byte is eight bits) per average symbol name to about 2.5 bytes, and from 4 bytes per address to about 3 bytes. For a representative system, which contains 10,000 routines, the overall reduction is from 180,000 bytes to 55,000 bytes.

Each routine name in the Routine Table is represented by a sequence of bytes encoded in ASCII, which is one byte (i.e., eight bits) for each character. The compression program rearranges the names into sets according to the length of the ASCII encoding. Each set of symbols is then processed separately. In the processing of each set of routines, each routine is encoded with three values—the first is a 14 bit value, the second is an 8 bit value and the third is an 8 bit value. The 14 bit value is the simple arithmetic sum of the "assigned value" of each character in the routine name. The second encoded value is a logical sum (exclusive OR) of each character in the name combined with the cumulative arithmetic sum of the characters up to that point (i.e., the 1st exclusive ORed with zero, then added to the 1st, the 2nd then exclusive ORed with the result and the sum of the 1st and 2nd added to that, and so on). The third encoded value is an alternating arithmetic sum of the characters in the odd numbered positions (1st, 3rd, 5th, etc.) with a logical sum of the characters in the even numbered positions (i.e., the 1st added to zero, then the 2nd exclusive ORed with the result, then the 3rd added to that, and so on).

The encoded methods are the result of trial and observation. The object is to arrive at an encoded result which is unique from all other results in the set of all routine names of a given length. The amount of storage required for an encoded result depends on how quickly a unique encoded value can be reached (if the 14 bit value is unique for a given name, no further encoding is necessary). The "assigned value" of each character used in the arithmetic and logical sum is an arbitrary value used for each character in lieu of its ASCII character code. The assigned values are spread out, rather than being sequential, to reduce the chance that different combinations of characters produce the same sum.

After performing the encodings for all routines of a given length are generated, the list of encodings is analyzed. For each encoding where the first 14 bit value is unique, the bits 00 are prepended to this quantity to make it a 16 quantity and to indicate that the encoding is 16 bits. The two eight bit encodings are discarded. For each encoding where the 22 bit value (first encoding and second encoding) is unique, the bits 01 are added to the front of this quantity to make it a 24 bit quantity and to indicate that the encoding is 24 bits. For each encoding where the 30 bit value (first encoding and second encoding and third encoding) is unique, the bits 1 followed by 0 are prepended to this quantity to make it a 32 bit quantity and indicate that the encoding is 32 bits. For those encodings which are not unique even out of 30 bits, the bits 1 and 1 are prepended to the 14 bit arithmetic sum, the two eight bit encoding are discarded, and the ASCII characters comprising the full routine name are substituted in their place. The full routine name is always unique, otherwise original code in printer 1 would not have compiled and linked properly.

Results of these encoding methods are about two thirds of the system routines require only the first encoded value (14 bit arithmetic sum), well over 99 percent are unique using the first and second encoding method, and virtually all are unique using all three encoded values. Typically, only one or two at most need to have the full routine name specified.

The encoding of the addresses of routines is entirely different. The addresses can be any number between 0 and 4 billion (a 32 bit hexadecimal unsigned number) and do not lend themselves well to encoding methods. Some space is saved with the following method: A set of 64 "base values" is provided as a starting point for reducing the addresses down to small numbers. For a given address, the largest base value is found that is not greater than the address. The difference between the address and the base value is stored, with leading zeros removed. The difference is usually a relatively small number with some leading zero bytes.

The compressed data stored consists of a control byte followed by the appropriate significant bytes. The control byte, in turn, contains two encoded fields. Two bits define the number of significant bytes that follow the control byte (00 for 1, 01 for 2, 10 for 3, and 11 for 4). The other 6 bits define which of the 64 base values was used in the encoding. The subsequent decoding of the routine value reverses the process. The first two bits of the control byte are used to extract the appropriate number of significant bytes, leading zero bytes are prepended, and the resulting number is added with the base value amount specified by the lower six bits of the control byte. The 64 base values are zero and the next 55 increments of 10000 in hexadecimal (hex) (which is 65,536 in decimal) (i.e., zero, 10000 [hex], 20000 [hex], and so on). Those each vary from the next by 65,536 in decimal, with the highest being 3,604,408 in decimal. Those are the closest to the addresses of the functional routines. The variables are located by much higher address numbers, and, to accommodate those, seven increments beginning with 20000000 hex (which is 536,870,912 in decimal), which vary from the next by 10000 hex (65,536 in decimal) are employed, the highest of these seven being 537,264,128 decimal. Finally, one basis is 28000000 hex (671,088,640 decimal) to accommodate the very highest numbers.

This encoding method reduces the average space required per routine address from four bytes to three. In the vast majority of cases, the difference between the routine address and the closest base value contains two leading zero bytes and two significant bytes. Thus, three bytes are required to encode it, rather than the four bytes that would be required for the straightforward non-encoded value.

Linking by the Printer

Figure 2:
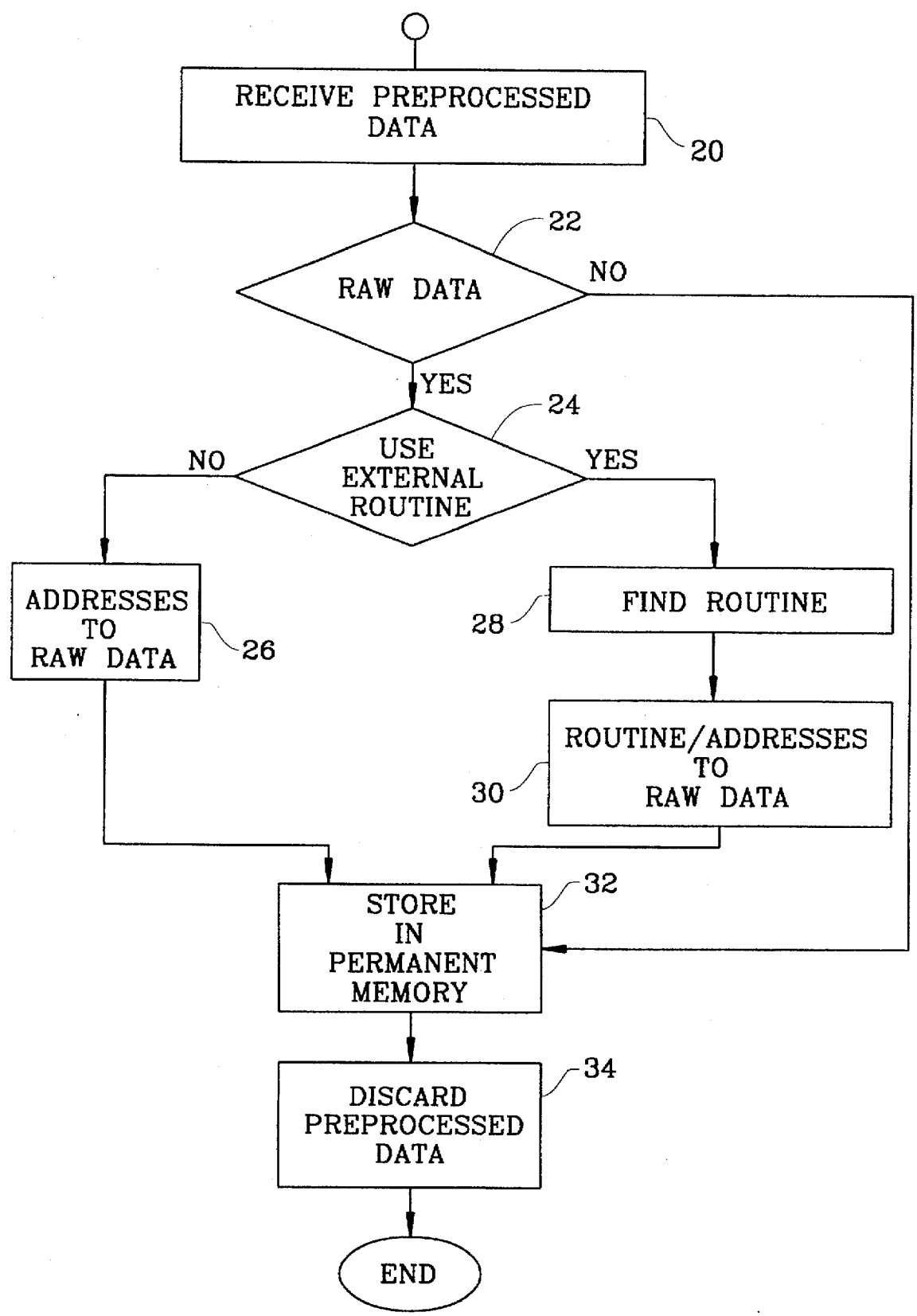

The linking steps of this preferred embodiment are illustrated in FIG. 2. Initially, of course, printer 1 receives the preprocessed file data, function 20, starting with the External Routine Table and then beginning with Raw Data 1 and its Relocation Tables 1, followed immediately by other Raw Data and its associated Relocation Tables. Linking in printer 1 may begin with the reception of the External Routine Table and the Raw Data 1 and Relocation Tables 1.

The data is examined for Raw Data in function 22. If yes, in the next function, function 24, the Relocation Table is examined for use of an external routine. If no, the associated addresses are combined with the Raw Data and it is stored in printer 1 in function 26. If yes, the routine name is employed to determine its size (an initial element in decompressing) and the three coded values, by which the location of the routine in the embedded table in printer 1 is found in function 28. Then the routine is applied to the Raw Data in accordance with the instructions of its Relocation Tables and associated addresses are combined with the Raw Data and stored in printer 1 in function 30.

At each conclusion of function 30 and function 26, function 22 is again invoked to examine received code for further Raw Data. If that operation of 22 is yes, the data processing returns to function 24. If no, the data processing stores the entire code in permanent location (usually flash memory) in function 32, and proceeds to function 34 in which the downloaded preprocessed file is discarded and the data processing ended.

Conclusion

It will be noted that the creation of the preprocessed code is done without immediate time or memory size restraints, and is done once for repeated reuse. Therefore, optimizing that code for use by the printer data processing is desirable. Of course, preparation of the downloaded code requires a knowledge of which routines are in the printer, and this is known for existing printers. It may be desirable to add routines particularly for the purpose of being used in an additional interpreter in accordance with this invention. Although the table of routines may be part of the original printer code, it also may be downloaded into the printer any time prior to its use. Other variations will be apparent and can be anticipated. Accordingly, patent coverage commensurate with this invention is sought, with particular reference to the accompanying claims.

What is claimed is:

1. A printer having a microprocessor which controls said printer and a memory which permanently stores data processing code to interpret at least a first page description language characterized by said memory having additional stored code comprising a table of routines and their addresses which may be used in a second page description language interpreter, and comprising data processing code to link downloaded raw data and downloaded related linking information using said table of routines as directed by said related linking information to form said second page description language interpreter.

2. The printer as in claim 1 in which said table of routines is compressed by storing for the names of each of said routines the result of arithmetic operations on each name of said routines in said table.

3. The printer as in claim 2 in which said table of routines is further compressed by storing as the address of each said routines a designation of one of more than 32 base numbers substrated from each address of said routines and the difference between the base number designated and each said address.

4. The printer as in claim 3 in which the numerical value assigned to each character of the names of said routines are separated by at least the value of two.

5. The printer as in claim 2 in which the numerical value assigned to each character of the names of said routines are separated by a least the value of two.

6. The method of adding function to an existing printer operative to interpret at least a first page description language to interpret a second page description language comprising preparing data processing code to interpret said second page description language which requires linking with existing routines in said printer, entering said prepared code into said printer, linking said prepared code in said printer using a table of routines and their location stored in memory in said printer to form an interpreter for said second page description language and storing said linked code in permanent memory of said printer.

7. The method as in claim 6 in which said table of routines is downloaded into said memory in said printer.

* * * * *